United State

Spiteri

[11] 3,711,704
[45] Jan. 16, 1973

[54] MARKER LIGHT AND LENS

[75] Inventor: Joseph Spiteri, Erie, Pa.

[73] Assignee: Rem Research, Inc., Harborcreek, Pa.

[22] Filed: Nov. 19, 1971

[21] Appl. No.: 200,547

[52] U.S. Cl.............240/106.1, 240/8.1 R, 350/211
[51] Int. Cl..........................F21v 5/04, F21v 5/05
[58] Field of Search.........240/8.1, 41.25, 106, 106.1; 350/211

[56] References Cited

UNITED STATES PATENTS

| | | | |
|---|---|---|---|
| 801,766 | 10/1905 | Churchill | 240/106.1 |
| 974,123 | 11/1910 | Churchill | 240/106.1 |
| 1,960,148 | 5/1934 | Gage | 240/106.1 |
| 2,921,180 | 1/1960 | Stiglin | 240/8.1 R |

*Primary Examiner*—Samuel S. Matthews
*Assistant Examiner*—Russell E. Adams, Jr.
*Attorney*—Charles L. Lovercheck

[57] ABSTRACT

A lamp especially suited for use as a marker light for a motor vehicle, such as a motor vehicle trailer. The light has two lamps, one of which will be automatically turned on when the other fails. The two lamps are located as close together as may be and the lens is so designed that the illumination from the fresnel lens will transmit the required illumination from each lamp. To this end the fresnel lens has serrations on the side of it adjacent the lamps. The serrations are formed by ridges having side edges which are flat. The fresnels are triangular in cross section and the side of all triangle cross sections of the serrations adjacent the center is parallel to a line passing through the center of the lens and through the center of the space between the lamps. The side of all triangular cross sections remote from the center lie in a line lying on the said side remote from the center and passing through the center of curvature of the lens.

4 Claims, 4 Drawing Figures

PATENTED JAN 16 1973 3,711,704
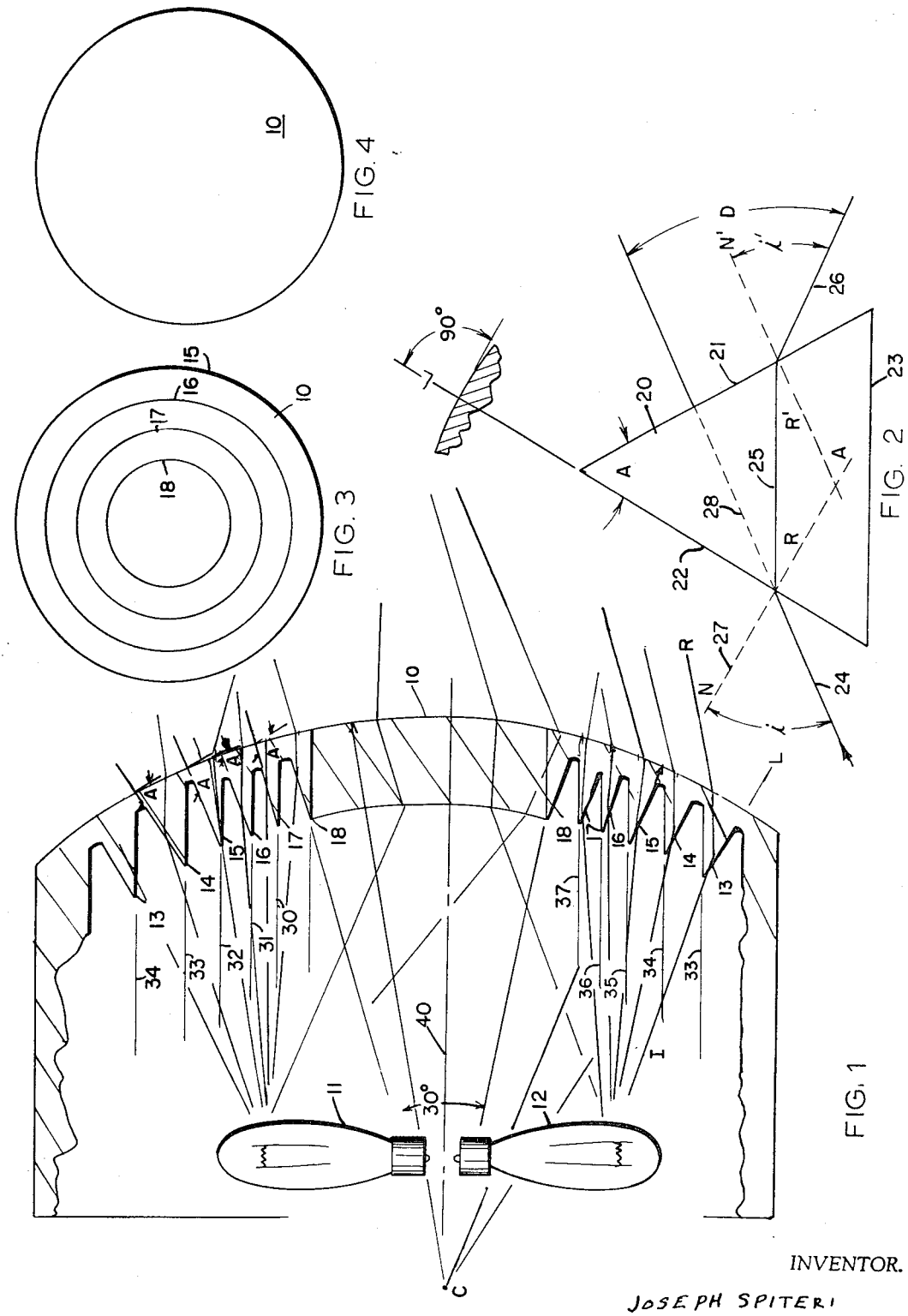
INVENTOR.
JOSEPH SPITERI

MARKER LIGHT AND LENS

OBJECTS OF THE INVENTION

It is, accordingly, an object of the invention to provide a marker light with two-filament lamps or two lamps. When one filament or lamp fails, the second filament or lamp will come on with sufficient intensity to meet the statutory requirements for motor vehicle lighting.

Still another object of the invention is to construct fresnel lenses in such a way as to reflect and refract the light output to meet the truck-trailer lighting requirements after the first filament fails.

Another object of the invention is to provide a fail-safe combination of lamps in combination with a lens.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit of sacrificing any of the advantages of the invention.

DESCRIPTION OF THE DRAWINGS

FIG. 1 is a diagram cross sectional view of the lens according to the invention.

FIG. 2 is a schematic diagram of light rays refracted through a prism.

FIG. 3 is a rear view of the lens shown in FIG. 1.

FIG. 4 is a front view of the lens shown in FIG. 1.

DETAILED DESCRIPTION OF THE DRAWINGS

Now with more particular reference to the drawings, a lens 10 is shown with lamps 11 and 12 spaced from it symetrically arranged around the center line 40. The lens 10 has fresnel rings 13, 14, 15, 16, 17, and 18 around it. On every radial cross section of the lens, the fresnel rings are in the form of isosceles triangles. The inner side of each ring formed by the apex of the triangle is parallel to the center line 40 as indicated by lines. The lamps 11 and 12 are located between the center of curvature C of the lenses and the lenses on the concave side of the lenses.

FIG. 2 shows a triangular prism 20 having sides 21, 22 and 23 and shows how a ray of light 24 passes through the prism and is refracted. A light ray 24 entering the side 22 of the prism will be refracted by the angle D shown and will pass through the prism on the line indicated at 25 and exit from the prism at angle 26, always being deflected toward the thick side of the prism.

It will be seen that the angle D defines an angle of an isosceles triangle. The rays 30, 32, 33, 34, 36 and 37 are all parallel to each other from the lamps and they all radiate from the hot filament of the lamps. These rays are deflected when passing through the lens. Thus the rays 30 from the lamps will pass directly through the lens. It will be seen that the rays that pass from the lamp 11 will be equal to the rays that pass from the lamp 12.

The central ring 18 defines approximately 30 degrees of the spherical outside surface.

The outer side of the triangle formed by the cross section of the lenses lies on line 60 passing through the lenses and deflects rays from either lamp to give a uniform pattern of light. The sides of each triangle adjacent the center of the lenses lies on a line generally parallel to the central axis of the lens. Thus the rays from lamps 11 and 12 will be deflected to give a uniform pattern at any point in front of the lens.

It will be seen from FIG. 2 that a light ray such as 24 will always be bent toward the thicker dimension of a prism. Thus light ray 24 is bent at 25 and again at 26.

The ray 27 is shown as disposed at an angle I to the ray 24, which enters the surface 22 and exits from the surface 20 of the prism. The ray 24 is disposed on the line 28 indicated.

When the light I passes through the prism, it is bent around the thicker part of the prism. A is a prism angle of the apex, D is the angle of deviation measured between the original direction of the incident ray I and the direction of the refracted ray R. Deviation is found to depend on the prism angle A. The index of refraction of the prism material and the angle of incident I.

The minimum deviation occurs when the ray passes through the prism symetrically making I equal to I' and R equal to R'.

Therefore, $D = 2i - A$ or $\frac{1}{2}(A+D)$ and $r = A/2$.

We have:

$n = [\sin \frac{1}{2}(A+D)]/\sin \frac{1}{2} A = $ Precise Index $\sin r = 1/n = $ Precise Critical (lens material to air)

Therefore, using a lens having an angle R, according to the above equation, and using a lamp of 2 candlepower, the base of the base line 13, 14, 15, 16 and 17 will always be at the angle of the apex of the lens and will always be the angle whose sin is $1/n$.

With the lens made with Fresnel, such as this, the lamp can be made to meet the Society of Automotive Engineering requirements of 0.62 candlepower at a distance of 12 inches from the lens using a 2 candlepower lamp bulb.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A marker light having two lamps,
   a fresnel lens having fresnel rings on the side thereof adjacent said lamps,
   said rings being triangular in cross section and having the side of said triangle adjacent to the central axis of the lens lying generally parallel to a line passing through the center of said lens and between said lamps, through the center of curvature of the lens, and the side of said triangle remote from the central axis lying on lines passing through the center of curvature of said lens and through the lens center.

2. The marker light recited in claim 1 wherein said triangles have an apex having an included angle of less than thirty degrees.

3. The marker light recited in claim 1 wherein the side of said triangle adjacent the first mentioned side is always disposed at right angles to a tangent to the lens base at the point where a line lying in the said side passes through the face of the lens.

4. The marker light recited in claim 1 wherein the central portion of said lens over approximately a 30° arc is solid and has no said fresnel rings therein.

* * * * *